(12) United States Patent
Montplaisir et al.

(10) Patent No.: US 11,346,700 B2
(45) Date of Patent: May 31, 2022

(54) SENSING APPARATUS FOR MONITORING A SUBSTANCE IN A STORAGE BUILDING

(71) Applicant: LES CONSULTANTS PENTERACT INC., Québec (CA)

(72) Inventors: Jean-François Montplaisir, Quebec (CA); Alain Moisan, Quebec (CA); Maxime Tremblay, Quebec (CA)

(73) Assignee: LES CONSULTANTS PENTERACT INC., Québec (CA)

( * ) Notice: Subject to any disclaimer, the term of this patent is extended or adjusted under 35 U.S.C. 154(b) by 0 days.

(21) Appl. No.: 17/055,894

(22) PCT Filed: May 14, 2019

(86) PCT No.: PCT/CA2019/050645
§ 371 (c)(1),
(2) Date: Nov. 16, 2020

(87) PCT Pub. No.: WO2019/218058
PCT Pub. Date: Nov. 21, 2019

(65) Prior Publication Data
US 2021/0223089 A1   Jul. 22, 2021

Related U.S. Application Data

(60) Provisional application No. 62/671,476, filed on May 15, 2018.

(51) Int. Cl.
*G01F 23/292* (2006.01)
*E04H 7/22* (2006.01)
*G01F 23/296* (2022.01)

(52) U.S. Cl.
CPC ............. *G01F 23/292* (2013.01); *E04H 7/22* (2013.01); *G01F 23/296* (2013.01)

(58) Field of Classification Search
CPC ........ G01F 23/292; G01F 23/296; E04H 7/22
See application file for complete search history.

(56) References Cited

U.S. PATENT DOCUMENTS

| 3,824,843 A | * | 7/1974 | Gebeshuber | ........... G21C 17/00 |
| | | | | 976/DIG. 207 |
| 4,166,395 A | * | 9/1979 | Dannehl | .............. G10K 11/355 |
| | | | | 976/DIG. 207 |

(Continued)

FOREIGN PATENT DOCUMENTS

CN          204730906 U      10/2015

OTHER PUBLICATIONS

EPO/ISR. PCT/CA2019/050645, PCT Search Report and Written Opinion dated Jul. 24, 2019, Les Consultants Penteract Inc. (7 pgs).

*Primary Examiner* — John Fitzgerald
(74) *Attorney, Agent, or Firm* — Crawford Maunu PLLC

(57) ABSTRACT

A sensing apparatus for monitoring a substance contained in a storage building, the apparatus comprising: a mounting bracket configured to be secured to a roof of the storage building; a sensing assembly mounted to the mounting bracket, the sensing assembly including: a sensor for measuring a parameter of the substance in the storage building when the sensor is in a measuring orientation; and a housing for housing the sensor, the housing being pivotably connected to the mounting bracket and being freely pivotable relative to the mounting bracket about a pivot axis, the housing being orientable in an operative position in which the sensor is in the measuring orientation to allow the sensor to measure the parameter of the substance, the sensing assembly having a center of mass located below the pivot axis such that the housing is urged towards the operative orientation by gravity.

21 Claims, 9 Drawing Sheets

(56) References Cited

U.S. PATENT DOCUMENTS

| | | | | |
|---|---|---|---|---|
| 4,692,023 A | * | 9/1987 | Ohtomo | G01F 23/292 356/5.11 |
| 5,576,492 A | * | 11/1996 | Phalin | G01N 29/225 73/629 |
| 5,648,844 A | * | 7/1997 | Clark | G01F 23/292 250/577 |
| 7,665,363 B2 | * | 2/2010 | Capilla | G01N 29/265 73/644 |
| 9,297,686 B1 | * | 3/2016 | Ross, Jr. | G01F 23/292 |
| 2004/0031335 A1 | * | 2/2004 | Fromme | G01F 22/00 73/865 |

* cited by examiner

SENSING APPARATUS FOR MONITORING A SUBSTANCE IN A STORAGE BUILDING

CROSS-REFERENCE TO RELATED APPLICATION

This application claims priority to U.S. Provisional Application Ser. No. 62/671,476 filed on May 15, 2018, the specification of which is incorporated herein by reference. This application is a national phase entry of PCT/CA2019/050645, filed on May 14, 2019, (now), the specification of which is incorporated herein by reference.

TECHNICAL FIELD

The present generally relates to monitoring apparatuses such as measuring apparatuses, and more specifically to measuring apparatuses to measuring a level of a substance, such as bulk material, contained in a storage building, such as a silo.

BACKGROUND

As advanced farming technologies including farm automation, precision farming and data mining operation related to agronomy are becoming widespread, there is a need for sensors adapted to the farming environment.

In particular, there is a need for more advanced technologies to be applied to the management of storage silos, which are amongst the main storage units for food, fertilizers and energy (e.g. wood chips and granules). More specifically, monitoring the weight and volume of the silo's content has become a key factor in evaluating cost and optimizing operations.

Many solutions for measuring the height or the weight of a substance contained in a silo already exist. Most of them using either sonar or lidar for height measurement, and/or strength gauges for weight. In most existing systems, a sensor, which could be either sonar or lidar, is provided to measure the height or level of the substance in the silo. The sensor is positioned above the substance and sends a signal downwardly towards the substance such as a wave of either sound or light which bounces off a top surface of the substance and returns an echo or reflected signal back to the sensor. The time interval between the emission of the signal and the reception of the signal after reflection of the signal on the substance at the bottom of the silo corresponds to the time needed for the signal to travel twice the distance between the sensor and the substance (i.e. once to reach the substance at the bottom of the silo and once more to return from the substance to the sensor).

Unfortunately, most systems currently on the market face two major drawbacks. The first drawback is that during refilling of the silo, the substance is typically dispensed in the silo through a refilling opening located near the top of the silo towards the bottom of the silo using powerful air pressure, which may for instance be created by a reverse vacuum system. This causes particles of crops or other matter in the silo to become suspended in the air inside the silo. Although the particles eventually settle, they will remain inside the silo and attach themselves to almost every surface in the silo, including the sensor. These particles may therefore obstruct the sensor and may prevent the sensor from properly emitting either sound or light, as well as prevent the sensor from properly receiving the reflected signal from the substance.

The other main drawback stems from the fact that the signal must travel towards the substance along a linear signal path which is oriented as close as possible to a vertical orientation so as to be generally perpendicular to the top surface of the substance at the bottom of the silo to ensure that the distance between the top surface of the substance and the sensor is accurately measured. Indeed, if the signal is perpendicular to the top surface of the substance, the signal will bounce back towards the sensor while travelling along the linear signal path and therefore travel the shortest possible distance between the substance and the sensor. In this configuration, the signal can be said to have a bouncing angle—defined between the linear signal path and the top surface of the substance in the silo—of 90 degrees. Any deviation of the linear signal path from this orientation may cause imprecisions in the measurement. Specifically, if the signal is reflected at an incidence or bouncing angle which is different from 90 degrees, the reflected signal may be reflected outside the sensing range of the sensor, which would prevent it from correctly measuring the distance between the substance and the sensor. The deviated reflected signal could also bounce against walls or objects in the silo before it is finally sensed by the sensor, which will cause the sensor to measure a distance which is greater the real distance.

The sensor must therefore be precisely positioned such that the linear signal path is as close as possible to a vertical orientation and maintained in this position during operation of the sensor. Unfortunately, existing system may not allow the sensor to be properly maintained in this orientation or involve relatively complex and time-consuming calculations and measurements from a user to ensure that the sensor is properly oriented.

The two problems described above can lead to bad measurements of the sensors or could even prevent the sensor from making any measurements. This may create a situation in which the data collected is either unreliable or not available when required.

SUMMARY

According to one aspect, there is provided a sensing apparatus for monitoring a substance contained in a storage building, the apparatus comprising: a mounting bracket securable to a roof of the storage building; a sensing assembly having a center of mass, the sensing assembly including: a housing pivotally connectable to the mounting bracket and hanging from the mounting bracket when connected thereto to be freely pivotable relative to the mounting bracket about a pivot axis, the center of mass of the sensing assembly being located below the pivot axis to urge the housing towards an operative position by gravity; and a sensor mounted to the housing and configured to measure a parameter of the substance in the storage building when the sensor is in a measuring orientation, wherein the sensor is configured in the measuring orientation when mounted to the housing with the housing being configured in the operative position.

In one embodiment, the sensor is configured for providing a signal downwardly towards a top surface of the substance along a linear signal path such that the signal is reflected on the top surface of the substance, and for receiving the reflected signal, and wherein, when the housing is in the operative orientation, the sensor is positioned relative to the top surface of the substance such that the reflected signal travels back upwardly towards the sensor along the linear signal path.

In one embodiment, when the housing is in the operative position, the linear signal path extends substantially vertically.

In one embodiment, the pivot axis extends substantially horizontally.

In one embodiment, the housing includes a bottom end and a top end, the pivot axis extending through the housing proximal the top end thereof and the center of mass of the sensing assembly is located towards the bottom end of the housing.

In one embodiment, the housing defines a central longitudinal axis intersecting the pivot axis and extending perpendicular thereto, the center of mass of the sensing assembly being located along the longitudinal central longitudinal axis.

In one embodiment, the housing includes a sidewall, a planar end wall extending orthogonally to the sidewall and a sensor opening defined in the end wall, the sensor being positioned adjacent the sensor opening and being oriented towards the sensor opening to provide the signal therethrough.

In one embodiment, the sensor is positioned within the housing such that the linear signal path is substantially orthogonal to the end face such that, when the housing is in the operative position, the end face extends substantially horizontally.

In one embodiment, the sensing assembly further includes a cover movably connected to the housing, the cover being movable between an open position in which the sensor opening is uncovered to allow the signal from the sensor to be provided towards the top surface of the substance and a closed position in which the sensor opening is covered.

In one embodiment, the cover is planar and extends generally parallel to the end wall, the cover being pivotably connected to the end wall.

In one embodiment, the cover is pivotable about a pivot axis extending orthogonally to the end wall and to the cover.

In one embodiment, the sensing assembly further includes a cover actuator operatively connected to the cover to control movement of the cover between the open and closed positions.

In one embodiment, the sensing assembly further comprises a processing unit operatively connected to the sensor, the processing unit being configured to determine a distance between the sensor and the top surface of the substance based on a time period between an emission of the signal towards the substance and a reception of the reflected signal.

In one embodiment, the signal is a light wave.

In one embodiment, the signal is a sound wave.

In one embodiment, the mounting bracket is configured to be positioned above the roof and adjacent a roof opening defined in the roof, the housing being connected to the mounting bracket such that the housing extends through the roof opening.

In one embodiment, the mounting bracket is annular, circumscribes the housing when connected thereto, and extends continuously around the roof opening.

In one embodiment, the apparatus further comprises at least one pivot pin extending along the pivot axis, the at least one pivot pin extending from one of the housing and the mounting bracket and engaging the other one of the housing and the mounting bracket to allow the housing to pivot relative to the mounting bracket.

In one embodiment, the at least one pin extends from the housing, and wherein the mounting bracket includes at least one pin opening for receiving the at least one pin.

In one embodiment, the at least one pivot pin includes a pair of pivot pins extending outwardly from the housing on either side of the housing, and wherein the at least one opening includes a pair of pivot openings, each pivot opening being sized and shaped to receive a corresponding pivot pin.

In one embodiment, the mounting bracket includes a flat annular body having a bottom face configured to be disposed towards the roof and a top face, and a rim wall extending away from the top face, the pin openings being defined in the rim wall.

In one embodiment, the rim wall includes a bottom edge connected to the annular body and a top edge opposite the bottom edge, and wherein the pair of pin openings includes a pair of semi-circular indents extending from the top edge towards the bottom edge to allow the housing to be lowered on the mounting bracket such that each pivot pin engages a corresponding semi-circular indent.

In one embodiment, the apparatus further comprises a sealing lid fastenable to the mounting bracket to cover the housing.

In one embodiment, the housing defines a sensor containing chamber and the sensor is contained inside the sensor containing chamber.

According to another aspect, there is also provided a sensing apparatus for monitoring a substance contained in a storage building, the sensing apparatus comprising: a sensor for monitoring the substance contained in the storage building; a housing mounted to a roof of the storage building and defining a sensor containing chamber for housing the sensor and positioning the sensor above the substance, the housing including a sensor opening for allowing the sensor access to the substance contained in the storage building, the housing being mounted to the storage building such that the sensor opening is located within the storage building; and a cover movably connected to the housing, the cover being movable between a closed position in which the bottom opening is covered and an open position in which the sensor opening is at least partially uncovered.

In one embodiment, the sensor is configured for providing a signal downwardly towards a top surface of the substance through the sensor opening when the cover is in the open position such that the signal is reflected on the top surface of the substance and for receiving the reflected signal through the sensor opening when the cover is in the open position, the sensor providing the signal along a linear signal path.

In one embodiment, the housing includes a sidewall and an end wall extending orthogonally to the sidewall, the sensor opening being defined in the end wall.

In one embodiment, the cover is planar and extends generally parallel to the end wall, the cover being pivotably connected to the end wall.

In one embodiment, the cover is pivotable about a pivot axis extending orthogonally to the end wall and to the cover.

In one embodiment, the sensing assembly further includes a cover actuator operatively connected to the cover to control movement of the cover between the open and closed positions.

According to yet another aspect, there is also provided a method for installing a sensing apparatus to a roof of a storage building, the sensing apparatus being configured to monitor a substance contained in a storage building, the method comprising: securing a mounting bracket to a roof of the storage building such that indents of the mounting bracket face generally upwardly; providing a sensing assembly including a housing and a sensor housed in the housing, the sensor being configured for sensing a parameter of the substance in the storage building, the sensing assembly further including pivot pins extending outwardly from the housing and defining a pivot axis; engaging the sensing assembly with the mounting bracket by engaging each one of the pivot pins in a corresponding one of the indents to allow the housing to pivot freely relative to the mounting bracket about the pivot axis, the sensing assembly having a center of mass located below the pivot axis such that the housing is urged towards an operative orientation by gravity.

In one embodiment, the method further comprises, after engaging the sensing assembly with the mounting bracket, fastening a sealing lid to the mounting bracket to cover the housing.

In one embodiment, the method further comprises forming a roof opening in the roof of the storage building and securing the mounting bracket adjacent to the roof opening with the housing extending at least partially into the roof opening.

In one embodiment, the indents defined in the mounting brackets comprise a pair of semi-circular indents and the pivot pins comprise a pair of pivot pins extending along the pivoting axis.

DETAILED DESCRIPTION

Figure 1:
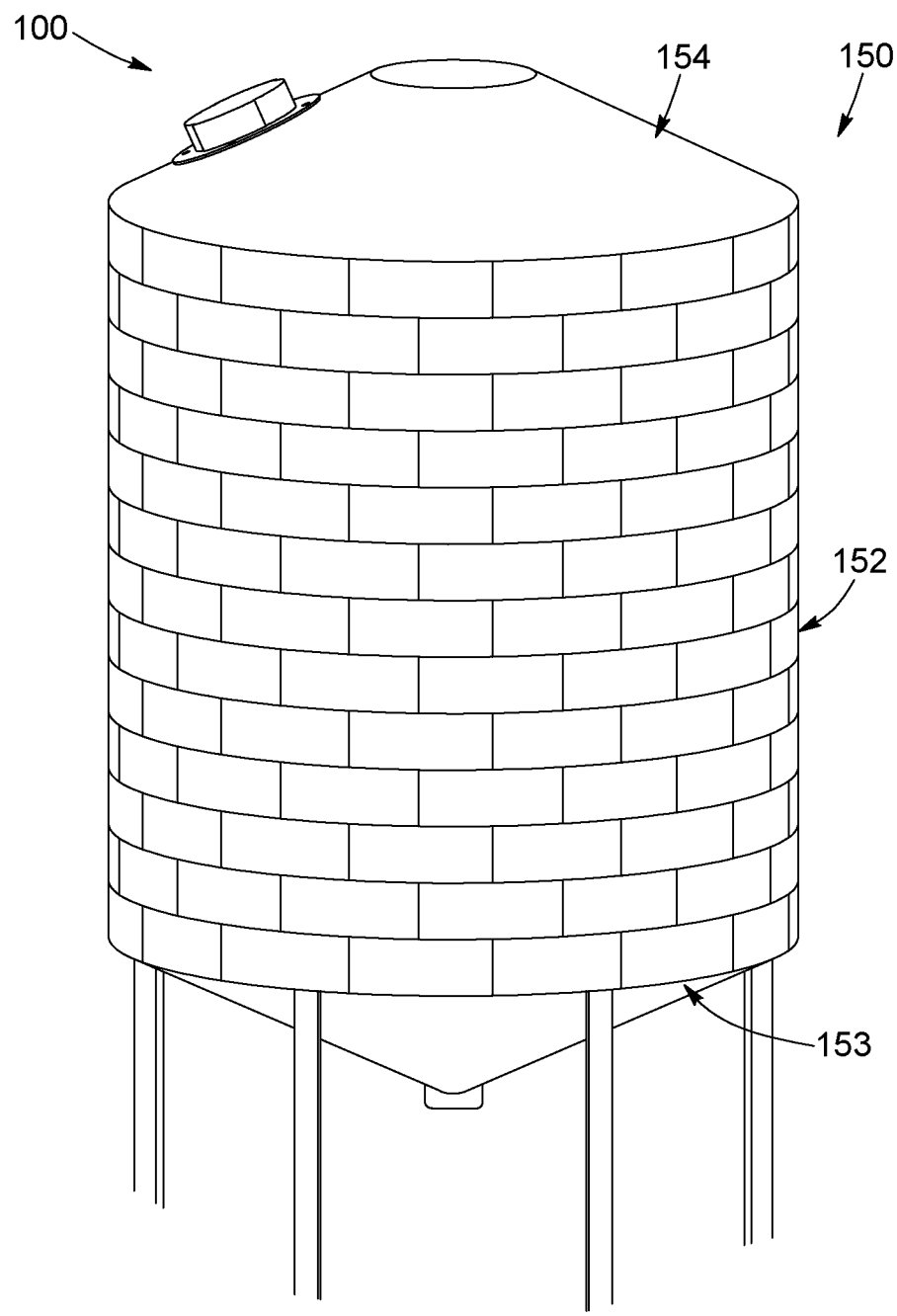
FIG. 1 is a perspective view of a silo and a sensing apparatus mounted to the silo, in accordance with one embodiment.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art, that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

For the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

Moreover, it will be appreciated that positional descriptions such as "above", "below", "higher", "lower", "top", "bottom", "forward", "rearward" "left", "right" and the like should, unless otherwise indicated, be taken in the context of the figures and correspond to the position and orientation in the silo and corresponding parts when being used. Positional descriptions should not be considered limiting.

Referring to FIGS. 1 to 7, there is shown a sensing apparatus 100 mounted to a storage building, in accordance with one embodiment. The storage building contains a substance and the sensing apparatus 100 is configured for monitoring the substance in the storage building.

In the illustrated embodiment, the storage building is a silo 150, but the storage building could alternatively include another type of storage building. Still in the illustrated embodiment, the substance contained in the silo 150 includes bulk material such as grain, coal, cement, carbon black, woodchips, food products, sawdust or the like. Alternatively, the substance could include a liquid.

In the illustrated embodiment, the silo 150 is hollow and includes a generally cylindrical sidewall 152, a floor 153 and a generally conical roof 154 disposed on top of the sidewall 152, opposite the floor 153. When the substance is received in the silo 150, the substance rests on the floor 153 and defines a top surface 1000 which faces upwardly towards the roof 154.

In the illustrated embodiment, the roof 154 has a roof angle or roof slope angle which is comprised between 15 degrees and 30 degrees, as is common for silo roofs. Alternatively, the roof 154 of the silo 150 may not be conical and could instead be planar and angled, or even be planar and substantially horizontal.

The roof 154 includes a roof opening 155 which is adapted to receive the sensing apparatus 100. More specifically, the sensing apparatus 100 includes a mounting bracket 200 which is adapted to be secured to the roof 154 of the silo 150, adjacent the roof opening 155.

Figure 7:
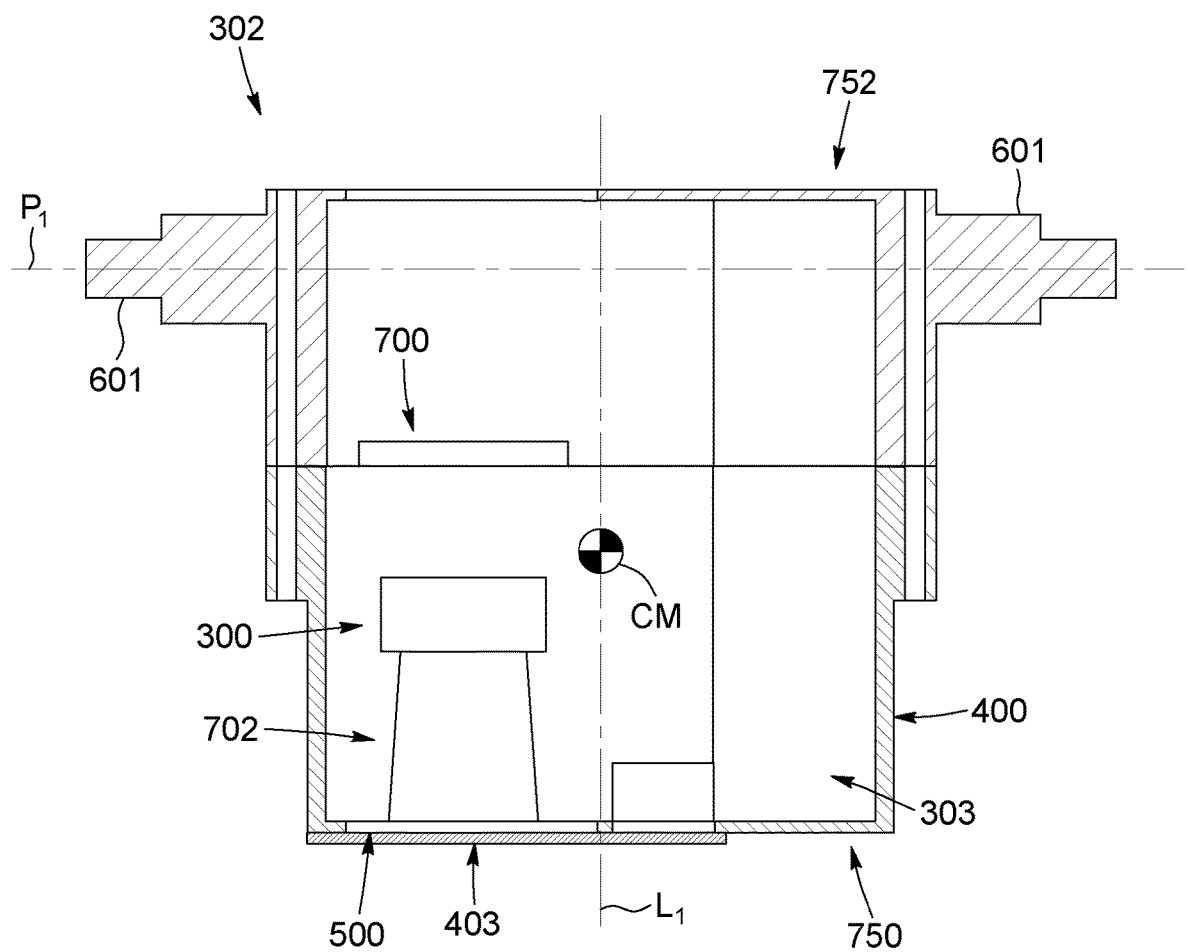
FIG. 7 is a cross-sectional view of the sensing apparatus illustrated in FIG. 1.

The measuring apparatus 100 further includes a sensing assembly 201 which comprises a sensor 300, best shown in FIG. 7, configured for measuring a parameter of the substance in the silo 150 and a housing 302 for housing the sensor 300. More specifically, the housing 302 is hollow and defines a sensor containing chamber 303 in which the sensor 300 is contained.

Figure 10:
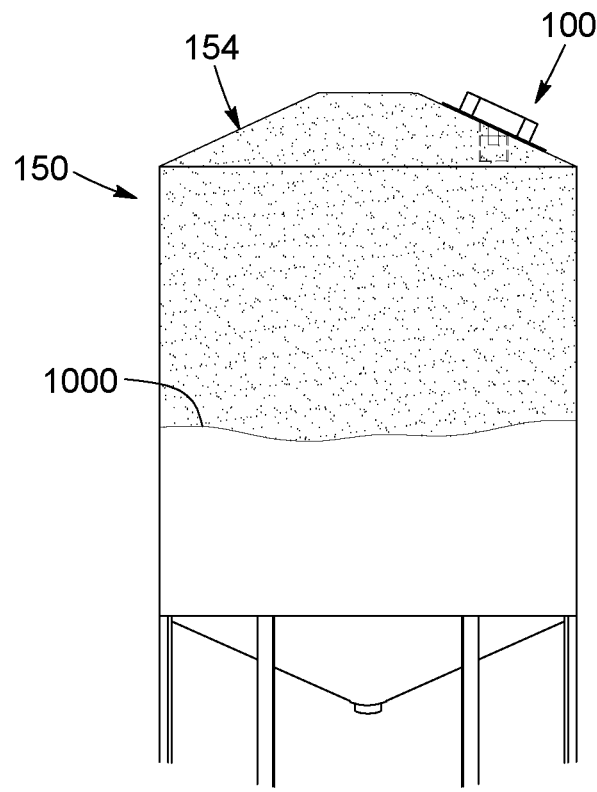
FIG. 10 is a schematic drawing showing a cross-sectional view of the sensing apparatus illustrated in FIG. 1 mounted to a silo, with particles suspended in the air inside the silo and with the cover closed to prevent the particles from contacting the sensor.

In the illustrated embodiment, the sensor 300 is configured for measuring a level of the substance contained in the silo 150. Specifically, the sensor 300 is configured to provide or emit a signal downwardly towards the top surface 1000 of the substance contained in the silo 150, as shown in FIG. 10. The sensor 300 is also configured to receive a reflection of the signal from the top surface 1000 of the substance. Based on a time period between the emission of the signal and the reception of the reflected signal by the sensor 300 and on a travel speed of the signal, a distance between the roof 154 of the silo 150 and the top surface 1000 of the substance can be determined. Furthermore, based on a distance between the floor 153 and the roof 154 of the silo 150, the level of the substance in the silo 150 could further be determined.

It will be understood that if the signal is not reflected towards the sensor 300 at an incidence angle substantially equal to 0 degrees (i.e. 90 degrees relative to the top surface 1000 of the substance), the reflection of the signal may not properly be received by the sensor 300. It is therefore desirable that the sensor 300 be maintained in a measuring orientation in which the signal emitted by the sensor 300 travels generally downwardly in a straight line along the linear signal path S and is reflected on the top surface 1000 of the substance such that the reflected signal travels back upwardly substantially along the linear signal path S towards the sensor 300.

In the illustrated embodiment, to achieve this configuration, when the sensor 300 is in the measuring orientation, the linear signal path S extends substantially vertically.

It will be understood that although the reflected signal is described herein as travelling substantially along the linear signal path S to be received by the sensor 300 (i.e. the reflected signal travelling along a linear travel path which is coincident with the linear signal path S of the signal), the reflected signal may not travel exactly along the linear signal path S, but may be slightly offset relative to the linear signal path S. Specifically, the sensor 300 may include a signal emitter and a signal receiver which is distinct from the signal emitter and which is slightly spaced laterally from the signal emitter. In this embodiment, the reflected signal can still be considered to travel along the linear travel path S, and the slight offset of the reflected signal relative to the linear travel path S would not significantly affect the sensor's ability to substantially accurately measure a distance between the sensor 300 and the top surface 1000 of the substance.

In one embodiment, the sensor 300 could use radar technology, lidar technology, sonar technology or similar technologies. Specifically, the sensor 300 could be configured to emit a light signal such as an infrared light wave, an ultraviolet light wave or a visible light wave, a sound wave such as an ultrasound wave, a radiofrequency (RF) signal, or any other type of signals which a skilled person would consider to be appropriate.

It will further be understood that the signal emitted by the sensor 300 could be a beam having a certain beam spread angle or beam angle. In this case, the linear signal path S would correspond to a central axis of the beam. Alternatively, the sensor 300 could be a sensor configured to emit a signal which is substantially linear and directed, such as a laser, in which case the laser beam emitted by the laser would follow the linear signal path S.

In the illustrated embodiment, the housing 302 is configured to position and maintain the sensor 300 in the measuring orientation to allow the sensor 300 to properly measure the level of the substance in the silo 150. Specifically, the housing 302 is connected to the mounting bracket 200 and extends through the roof opening 155 to allow the sensor 300 to have access to an interior of the silo 150. Alternatively, instead of extending through the roof opening 155, the housing 302 could be configured to position the sensor 300 such that the sensor 300 is aligned with the roof opening 155, but remains above the roof 154.

In the illustrated embodiment, the housing 302 is pivotably connected to the mounting bracket 200 and is adapted to pivot relative to the mounting bracket 200 about a pivot axis P. The housing 302 may be oriented relative to the mounting bracket 200 in an operative orientation in which the sensor 300 is in the measuring orientation to allow the sensor to measure the level of the substance in the silo 150. To ensure that the housing 302 is in the operative orientation during operation of the sensor 300, the housing 302 is freely pivotable relative to the mounting bracket 200 and the sensing assembly 201 (i.e. the housing 302 and the sensor 300 contained in the housing 302) has a center of mass CM which is located such that the housing 302 is urged in the operative position. It will be appreciated that gravity acting on the center of mass CM of the sensing assembly 201 will urge the housing 302 towards an equilibrium position in which the center of mass CM is at the lowest possible height.

It will further be appreciated that this configuration eliminates the need for the user to calculate and/or measure a position of the sensor 300 to confirm that the sensor 300 is in the proper measuring orientation, since the housing 302 will naturally reach the operative position in which the sensor 300 is the measuring orientation. In this configuration, gravity also ensures that once the housing 302 has reached the operative orientation, the housing 302 is maintained in the operative orientation. This may facilitate the installation and use of the sensing apparatus 100, as well as allow the sensor 300 to make more accurate measurements.

In the illustrated embodiment, the housing 302 has a bottom end 450 and a top end 452. When the housing 302 is in the operative orientation, the bottom end is disposed downwardly towards the substance in the silo 150 and the top end is disposed upwardly away from the substance in the silo 150. In the illustrated embodiment, the housing 302 is further elongated and defines a central longitudinal axis $L_1$, best shown in FIG. 7, which extends through the top and bottom ends 452, 450 of the housing 302.

Figure 5:
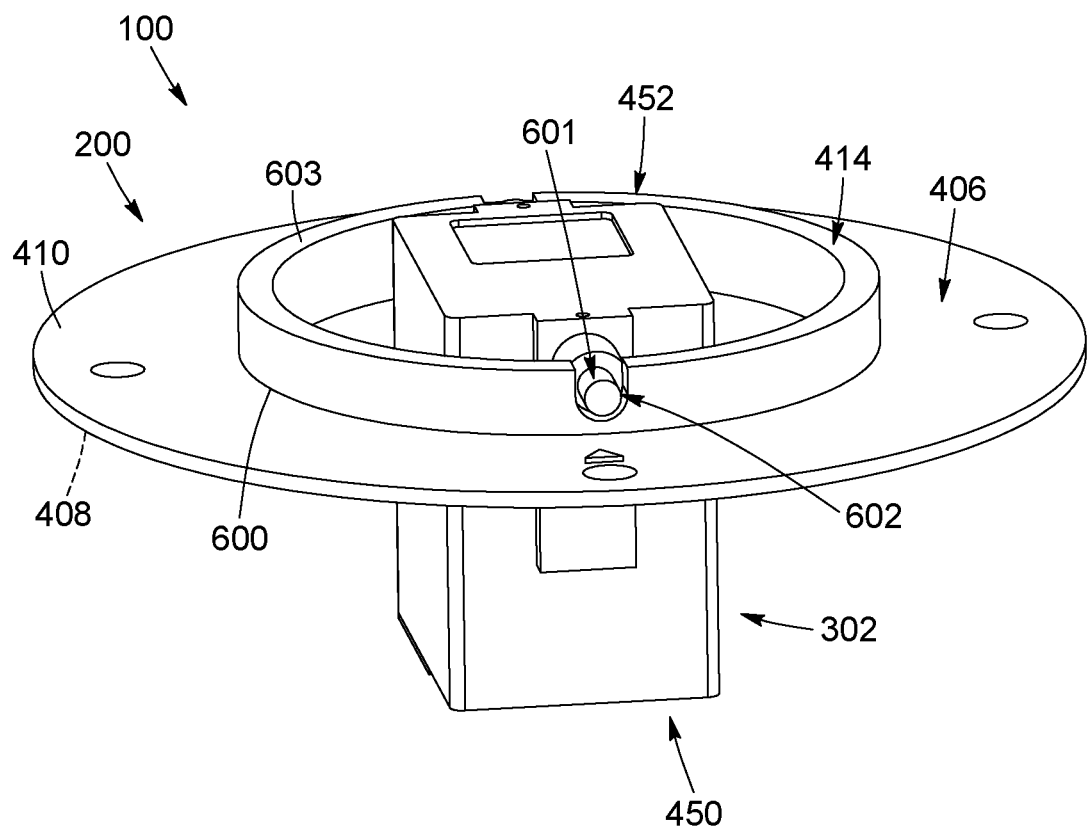
FIG. 5 is a perspective view of the sensing apparatus illustrated in FIG. 1, with the sealing lid removed.

Still in the illustrated embodiment, the housing 302 is rectangular and includes a sidewall 400 and a planar end wall 402, best shown in FIG. 5, which extends generally orthogonally to the sidewall 400. More specifically, the sidewall 400 includes first and second faces 460, 462 which extend generally parallel to each other and third and fourth faces 464, 466 which extend generally parallel to each other and orthogonally to the first and second faces 460, 462.

Alternatively, instead of being rectangular, the housing 302 could instead be cylindrical, in which case the sidewall 400 would be curved, or have any other shape which a skilled person would consider to be suitable.

The housing 302 is hollow to house the sensor 300. In the illustrated embodiment, the housing 302 includes an upper housing portion 470 located at the top end 452 of the housing 302 and a lower housing portion 472 located at the bottom end 450 of the housing 302. The upper and lower housing portions 470, 472 are fastened together and could be unfastened by a user to provide access to an interior of the housing 302 to facilitate the maintenance of the sensing apparatus 100. This configuration could also facilitate the manufacturing of the sensing apparatus 100. Alternatively, the housing 302 may not include upper and lower housing portions and the housing 302 may instead be formed as a single, unitary body.

In the illustrated embodiment, the housing 302 further includes a sensor opening 500, best shown in FIG. 5, defined in the end wall 402. The sensor 300 is positioned in the housing 302 adjacent the sensor opening 500 and is oriented towards the sensor opening 500 to provide the signal out of the housing 302 and towards the top surface 1000 of the substance in the silo 150. The sensor 300 is further positioned within the housing 302 such that the linear signal path S of the signal exiting the housing 302 is generally perpendicular or orthogonal to the end wall 402. Therefore, when the housing 302 is in the operative orientation such that the linear signal path S extends substantially vertically, the end wall 402 extends substantially horizontally. In the illustrated embodiment, the linear signal path S further extends parallel to the central longitudinal axis $L_1$ of the housing 302, and therefore, the end wall 402 is further perpendicular to the central longitudinal axis $L_1$.

Figure 6C:
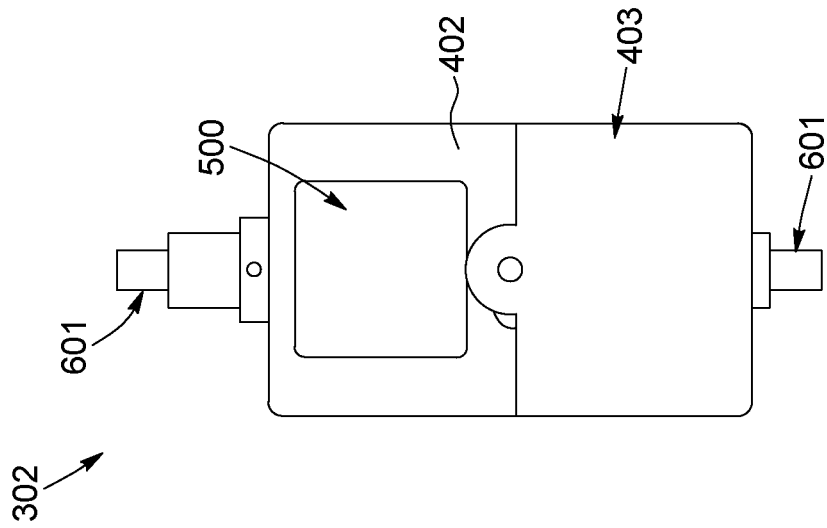
FIG. 6C is another bottom plan view of the sensing apparatus illustrated in FIG. 1, with the cover in the open position.
Figure 6B:
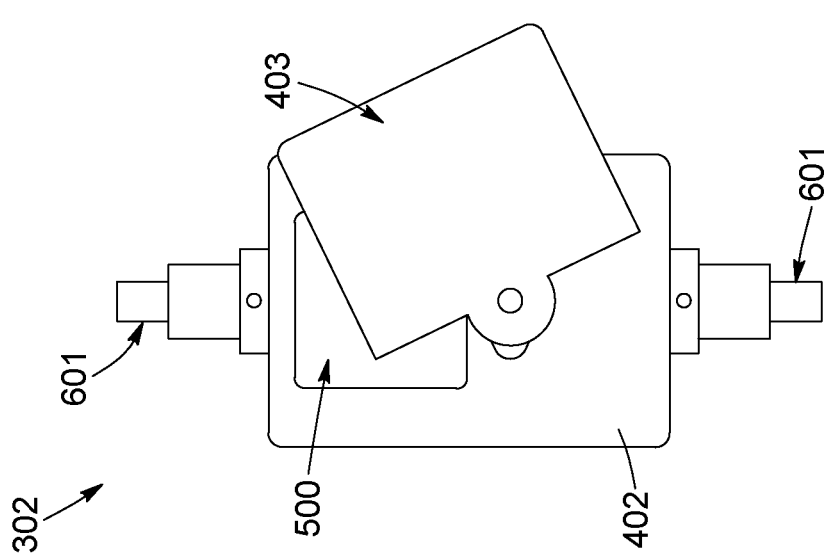
FIG. 6B is another bottom plan view of the sensing apparatus illustrated in FIG. 1, with the cover partially pivoted towards the open position.
Figure 6A:
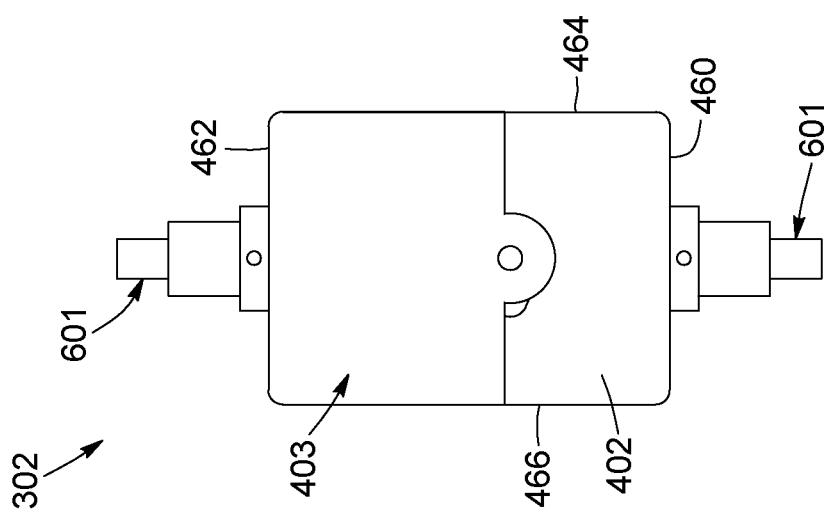
FIG. 6A is a bottom plan view of the sensing apparatus illustrated in FIG. 1, with the cover in the closed position.

As best shown in FIGS. 6A to 6C, the sensor opening 500 is substantially offcentered relative to the central longitudinal axis $L_1$. In this configuration, the linear signal path S is substantially parallel to the central longitudinal axis $L_1$, but is spaced laterally from the central longitudinal axis $L_1$. Alternatively, the sensor opening 500 could instead be centered on the end wall 402. In this configuration, the linear signal path S would extend along the central longitudinal axis $L_1$. In yet another embodiment, the linear signal path S may not be parallel to the central longitudinal axis $L_1$ and may instead be angled relative to the central longitudinal axis $L_1$.

In the illustrated embodiment, the apparatus 100 further includes a pair of pivot pins 601 for pivotably connecting the housing 302 to the mounting bracket 200. More specifically, the pivot pins 601 extend outwardly from the housing 302 from the first and second side faces 460, 462 of the sidewall 400 and are substantially aligned with each other on either side of the housing 302 to define a pivot axis $P_1$ of the housing 302 relative to the mounting bracket 200. As shown in FIG. 7, the pivot axis $P_1$ extends perpendicular to the central longitudinal axis $L_1$, and the pivot pins 601 are located near the top end 452 of the housing 302 such that the pivot axis $P_1$ is also located towards the top end 452 of the housing 302. The center of mass CM is further located towards the bottom end 450 of the housing 302 to ensure that the bottom end 450 of the housing 302 is located downwardly when the housing 302 is in the operative position.

In the illustrated embodiment, the pivot pins 601 are further substantially centered between the third and fourth side faces 464, 466 such that the pivot axis P therefore intersects the central longitudinal axis $L_1$. Still in the illustrated embodiment, the center of mass CM is further located along the central longitudinal axis $L_1$ to ensure that gravity urges the housing 302 towards the operative orientation in which the central longitudinal axis $L_1$ extends vertically. In other words, the equilibrium position of the housing 302 is also its operative orientation.

Alternatively, the housing 302 could be shaped and configured differently, in which case the center of mass CM may be located at a different location in the housing 302. For example, if the housing 302 is asymmetrical, the center of mass CM may not be located on the longitudinal axis $L_1$ of the housing 302, but would instead be located at another location which would allow the sensor 300 to send a signal along a linear signal path S which extends substantially vertically.

Figure 4:
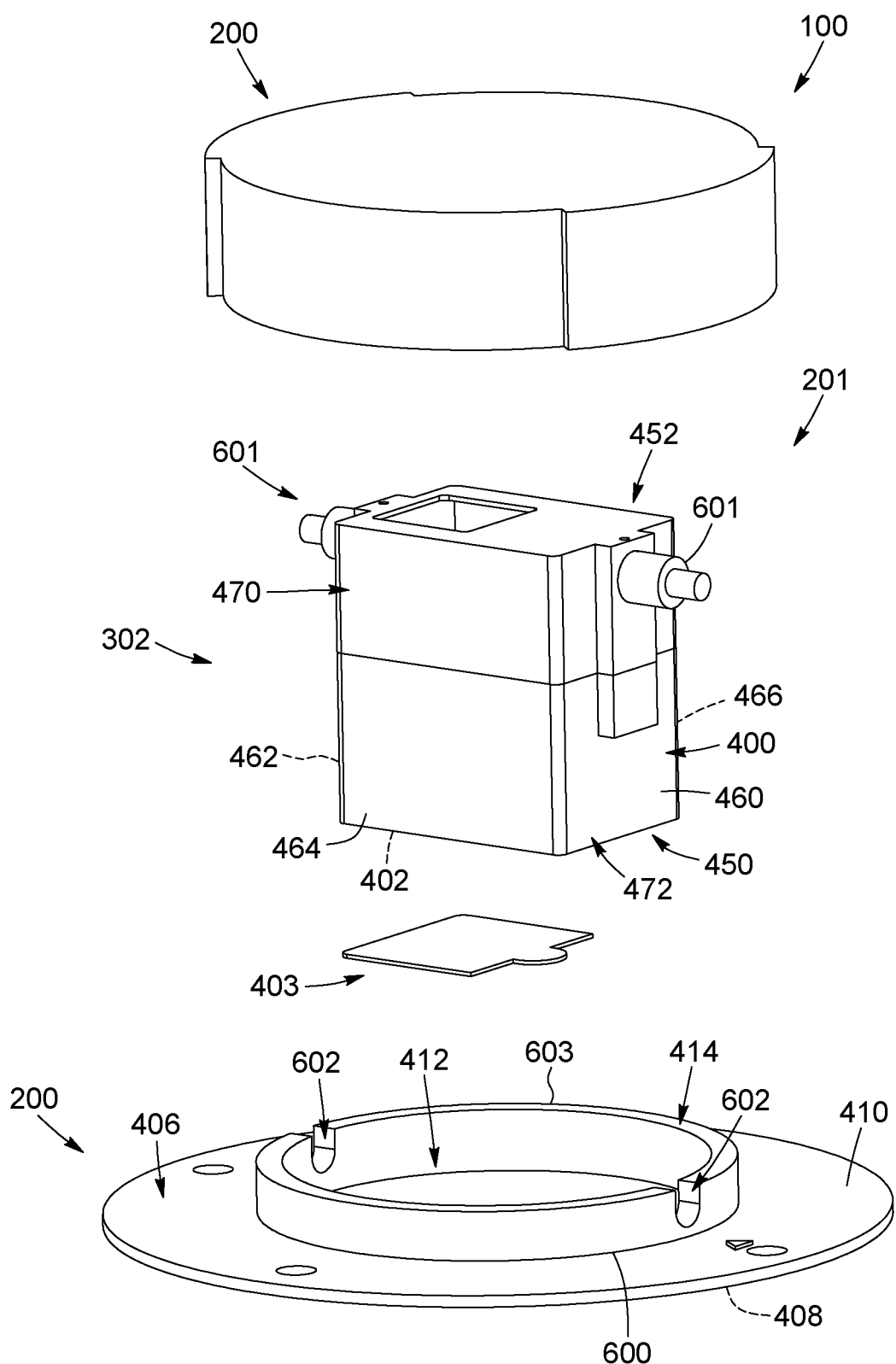
FIG. 4 is an exploded view of the sensing apparatus illustrated in FIG. 1.

Referring to FIGS. 4 and 5, the mounting bracket 200 includes a flat annular body 406 adapted to be disposed around the roof opening. The annular body 406 has a bottom face 408 adapted to be placed against the roof and a top face 410 opposite the bottom face 408. The mounting bracket 200 further includes a central opening 412 which is adapted to receive the housing 302 and which generally corresponds to the roof opening 155, and a cylindrical rim wall 414 which extends away from the top face 410 and around the central opening 412. The rim wall 414 has a circular bottom edge 600 located against the top face 410 and a circular top edge 603 located away from the top face 410. The mounting bracket 200 further includes a pair of generally semi-circular indents 602 defined in the rim wall 414. More specifically, the semi-circular indents 602 extend from the top edge 603 towards the bottom edge 600 of the rim wall 414.

The semi-circular indents 602 define pivot openings which are sized and shaped to receive the pivot pins 601. Specifically, the pivot pins 601 are adapted to simply be received the indents 602 and rest on the rim wall 414 while remaining unsecured from the mounting bracket 200, to thereby allow the housing 302 to pivot freely relative to the mounting bracket 200 about the pivot axis $P_1$. In one embodiment, the indents 602 are sized and shaped to allow the housing 302 to pivot across a range of 64 degrees. Alternatively, the indents 602 may be sized and shaped to allow the housing 302 to pivot relative to the mounting bracket 200 across a larger or smaller angular range.

To install the apparatus 100 on the roof 154 of the silo 150, the mounting bracket 200 is first secured to the roof 154, adjacent the roof opening 155. Specifically, the central opening 412 of the mounting bracket 200 is aligned with the roof opening 500 such that the annular body 406 surrounds the roof opening 155.

In one embodiment, before securing the mounting bracket 200 to the roof 154, a gasket may first be secured to the roof 154 adjacent the roof opening 155 and the bottom face 408 of the annular body 406 may be placed against the gasket.

Figure 2:
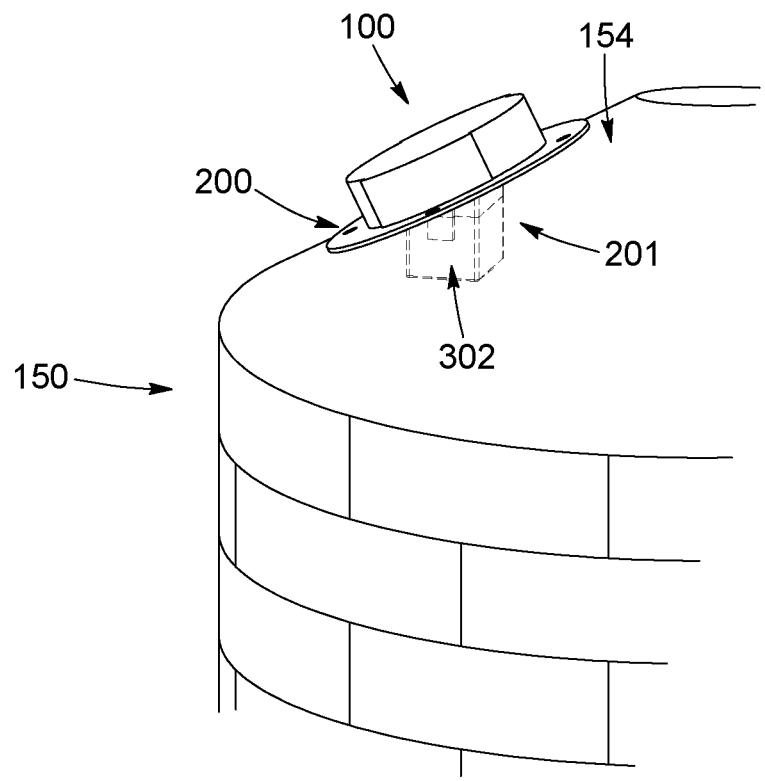
FIG. 2 is an enlarged view of a portion of the silo and the sensing apparatus illustrated in FIG. 1.

Once the mounting bracket 200 is secured to the roof 154, the housing 302 may then simply be aligned with the central opening 412 and may be lowered towards the mounting bracket 200 such that the pivot pins 601 are received in the semi-circular indents 602. In the illustrated embodiment, the mounting bracket 200 is positioned and oriented on the roof 154 such that when the housing 302 engages the mounting bracket 200, the pivot axis $P_1$ extends substantially horizontally. Still in the illustrated embodiment, when the housing 302 engages the mounting bracket 200, the housing 302 extends through the central opening 412 and through the roof opening 155. As best shown in FIG. 2, in this position, the bottom end 750 of the housing 302 is located inside the silo 150, slightly below the roof 154.

It will be appreciated that in the configuration described above, the housing 302 will auto-level or self-align itself once received in the mounting bracket 200, regardless of the angle of the roof 154, which eliminates the need to measure the angle of the roof 154 and which minimizes the possibilities of errors which could occur if the housing 302 was oriented manually. Furthermore, providing the mounting bracket 200 and the housing 302 as two separate components may facilitate the installation of the apparatus 100 by allowing the mounting bracket 200 to be properly positioned and secured in a first operation, and then connecting the housing 302 to the mounting bracket 200 in a second operation. It will also be appreciated that once the mounting bracket 200 has been secured to the roof 154, the assembly of the housing 302 to the mounting bracket 200 does not require any tools, which further facilitates installation of the apparatus 100 to the roof 154.

In one embodiment, instead of comprising two separate pins, the pivot pins could be defined by opposed ends of a pivot axle extending through the first and second faces of the housing 302. In another embodiment, the apparatus 100 could instead include a single pivot pin instead of a pair of pivot pins. In yet another embodiment, instead of the pivot pins 601 extending from the housing 302 and engaging the pivot openings defined in the mounting bracket 200, the pivot pins could instead extend from the rim wall 414 inwardly to engage corresponding pivot openings defined in the housing 302. Alternatively, the apparatus 100 could include any other connection which would allow the housing 302 to freely pivot relative to the mounting bracket 200.

In some embodiments, the silo 150 may be a conventional silo, and therefore may not include an appropriate roof opening. In these embodiments, the roof opening 155 may first be formed in the roof 154 by cutting the roof opening 155 using an appropriate tool.

In the illustrated embodiment, to protect the housing 302 from rain and dust, the apparatus 100 further includes a sealing lid 202 which is adapted to be placed over the housing 302, above the roof 154 of the silo 150. Specifically, the sealing lid 202 is substantially circular and has a diameter which is greater than the diameter of the roof opening and rests on the mounting bracket 200 around the roof opening 155.

In one embodiment, the sealing lid 202 could further be fastened to the mounting bracket 200. Specifically, once the mounting bracket 200 has been secured to the roof 154 and the housing 302 has been pivotably connected to the mounting bracket 200, the sealing lid 202 could be positioned over the housing 302 and fastened to the mounting bracket 200. In one embodiment, the sealing lid 202 could be configured to be snapped on the rim wall 414 of the mounting bracket 200. In another embodiment, the sealing lid 202 could be fastened to the mounting bracket 200 using one or more fasteners extending through the sealing lid 202 and through the rim wall 414. Alternatively, the sealing lid 202 could be permanently secured to the mounting bracket 200 or to the housing 302. In yet another embodiment, the apparatus 100 may not comprise the sealing lid 202.

Figure 3:
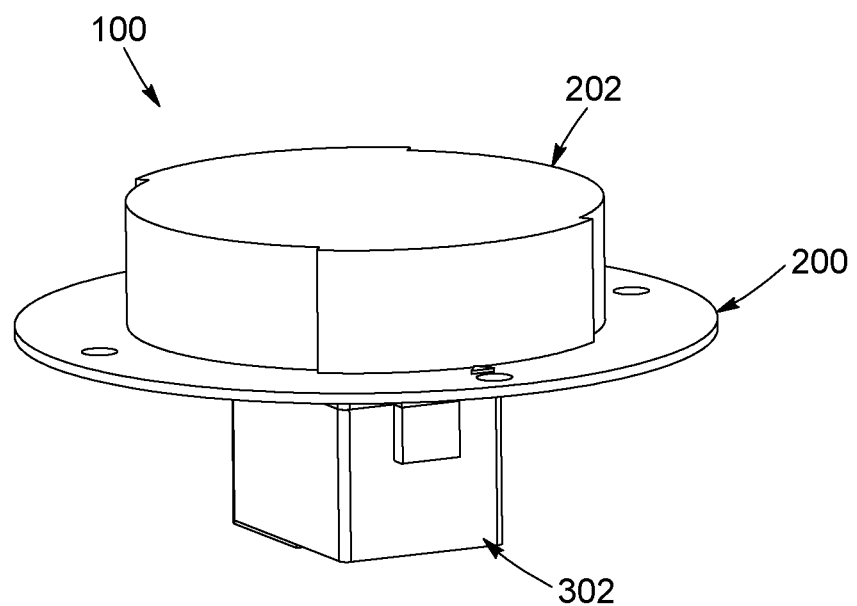
FIG. 3 is a perspective view of the sensing apparatus illustrated in FIG. 1.

Referring now to FIGS. 4 and 6A to 6C, the apparatus 100 further includes a covering pad or cover 403 adapted to be placed over the sensor opening 500 of the housing 302. Specifically, the cover 403 is movable relative to the housing 302 between an open position in which the sensor opening 500 is uncovered to allow the signal from the sensor 300 to be provided towards the top surface 1000 of the substance and a closed position in which the sensor opening 500 is covered. As best shown in FIG. 3, when the housing 302 is mounted to the mounting bracket 200, the end wall 402 of the housing 302 and therefore the opening 500 defined on the end wall 402 is located below the roof 154 inside the silo 150. As further shown in FIG. 11, when the substance such as grain or any other bulk material is loaded into the silo 150, it falls towards the bottom of the silo 150 and often creates a cloud of particles 1100 suspended in the air inside the silo 150. When the cover 403 is placed over the sensor opening 500, the cover 403 prevents particles from entering the housing 302 through the opening 500 and thereby protects the sensor 300 and other components inside the housing 302.

In the illustrated embodiment, the cover 403 is pivotably connected to the housing 302. Specifically, the cover 403 is planar and extends generally parallel to the end wall 402. The housing 302 includes a cover pivot pin 502 which extends away from the end wall 402 of the housing 302, generally parallel to the central longitudinal axis $L_1$ of the housing 302, and through the cover 403. The cover 403 is therefore allowed to pivot along the end wall 402, in a pivot plane which is substantially parallel to the end wall 402. In other words, the cover 403 remains parallel to the end wall 402 as it pivots. Alternatively, the cover 403 could instead be hingeably connected to the end wall 402 such that the cover 403 may be angled away from the sensor opening 500 to thereby uncover the sensor opening 500. In yet another embodiment, the cover 403 could be slidably mounted to the end wall 402 and could slide laterally relative to the housing 302 while remaining parallel to the end wall 402 to selectively cover and uncover the sensor opening 500. In yet another embodiment, the cover 403 could have a shutter-like configuration, or have any other configuration which would allow the sensor opening 500 to be selectively covered and uncovered.

In the illustrated embodiment, the cover 403 is generally rectangular, and the sensor opening 500 is also rectangular and is slightly smaller than the cover 403 to allow the cover to entirely cover the sensor opening 500 when the cover 403 is in the closed position. Alternatively, instead of being rectangular, the cover 403 and the sensor opening 500 could instead have any other shape which a skilled person would consider to be appropriate. For example, in an embodiment in which the housing 302 is cylindrical, the end wall 402 would be circular and the cover could be generally shaped as a circle sector.

Figure 8:
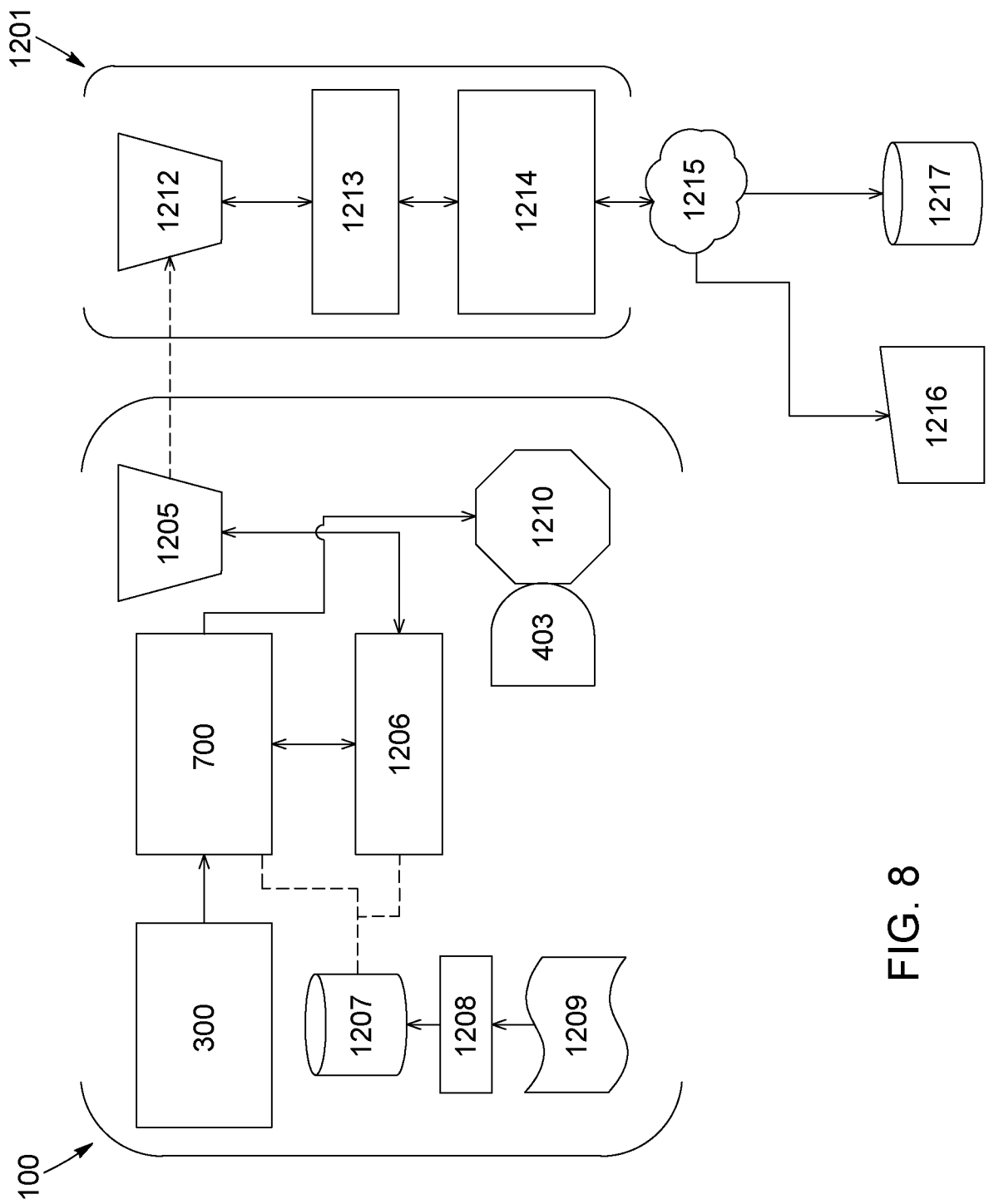
FIG. 8 is a block diagram showing a sensing system including the sensing apparatus illustrated in FIG. 1.

In one embodiment, the cover 403 and/or the pivot pin 502 may be operatively connected to a cover actuator 1210, as shown in FIG. 8, to control pivoting of the cover 403. Specifically, the cover actuator 1210 could include a step motor which could pivot the cover 403 in certain predetermined position. For example, the step motor 1210 could be configured to pivot the cover 403 by steps of 180 degrees between the open position and the closed position.

In one embodiment, the cover 403 is normally in the open position to allow the sensor 300 to provide the signal towards the substance and to receive the reflected signal from the substance. The cover 403 could be moved to the closed position in specific situations such as when the silo 150 is being refilled as shown in FIG. 10.

Figure 9:
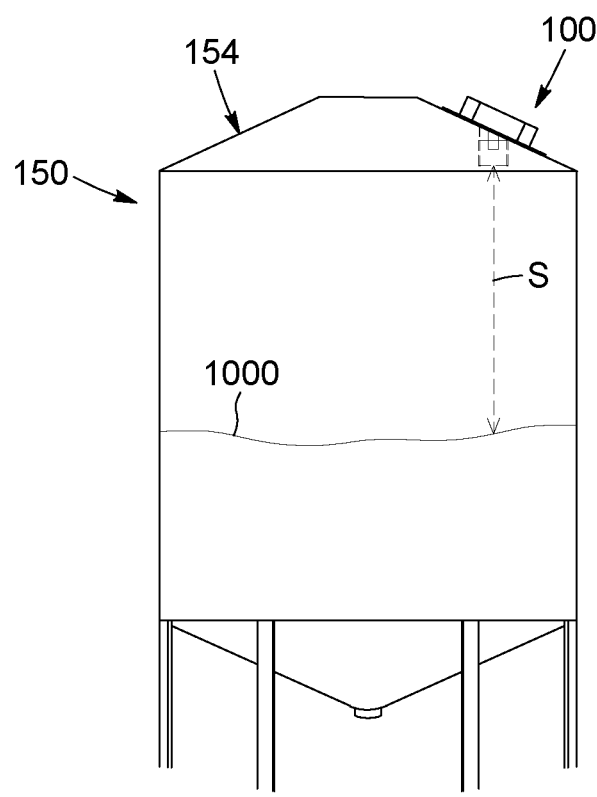
FIG. 9 is a schematic drawing showing a cross-sectional view of the sensing apparatus illustrated in FIG. 1 mounted to a silo, with the cover in the open position and with the sensor emitting a signal towards a top surface of the substance in the silo and receiving the reflected signal from the top surface of the substance in the silo.

For example, FIG. 9 shows the apparatus 100 mounted to the silo 150 and being used to measure a level of the substance in the silo 150. The sensor 300 of the apparatus 100 emits a signal downwardly and generally vertically along the linear signal path, towards a top surface 1000 of the substance in the silo. The signal is reflected on the top surface 1000 of the substance and the reflected signal 1002 then travels back upwardly towards the sensor 300, again along the linear signal path, and is received by the sensor 300 of the apparatus 100.

Turning to FIG. 10, when the substance such as grain or the like is poured or otherwise provided in the silo 150, particles suspended in the air inside the silo 150 may form a cloud 1100 inside the silo 150. In this case, the cover 403 may be moved to the closed position to prevent particles from entering the housing 302. In one embodiment, the cover 403 may be closed manually by a user via an actuator operatively connected to the cover 403. Alternatively, the cover 403 may be operatively connected to a particle sensor which is adapted to detect the presence of particles suspended in the air inside the silo 150 and move the cover 403 to the closed position in response.

Referring now to FIGS. 7 and 8, the apparatus 100 could further include a processing unit 700 operatively connected to the sensor 300 and housed in the housing 302. The apparatus 100 may further include a signal directing or amplifying device 702 such as a lens or an acoustic cone which directs the signal from the sensor 300 through the sensor opening 500 of the housing 302 and towards the substance in the silo 150.

The processing unit 700 may be configured to filter and analyze data received from the sensor 300. Specifically, the processing unit 700 may be adapted to calculate or determine a distance between the sensor 300 and the top surface 1000 of the substance in the silo 150 using the following formula:

$$Distance=(\Delta t*V)/2$$

wherein $\Delta t$ corresponds to the time period between the emission of the signal by the sensor 300 and the reception of the reflected signal by the sensor 300, and wherein V corresponds to the speed of the signal. The level of the substance in the silo 150 would therefore generally correspond to the difference between the calculated distance and the distance between the sensor 300 and the floor of the silo 150.

The processing unit 700 is further operatively connected to a communication unit 1206 which is further operatively connected to an antenna 1205 allowing data to be sent using cellular, ISM, WiFi, Mesh or satellite communication technologies to one or more remote receiving units 1201.

In the illustrated embodiment, the apparatus 100 further includes a battery 1207 operatively connected to the processing unit 1204 and/or the communication unit 1206 to power the processing unit 1204 and/or the communication unit 1206. The apparatus 100 further includes a solar panel 1209 operatively connected to a battery charger 1208 which is operatively connected to the battery 1207 to allow the battery 1207 to be recharged using solar power. The solar panel 1209 could be located on the sealing lid 202, for example, or on the mounting bracket 200, or be mounted on the roof 154 near the apparatus 100. Alternatively, the solar panel 1209 could be located remotely from the silo 150. In yet another embodiment, the apparatus 100 may not comprise a solar panel and the battery charger 1208 could instead be configured to be operatively connected to a domestic electrical grid to charge the battery 1207. In yet another embodiment, the apparatus 100 may not comprise a battery charger 1208 and the battery 1207 may instead be a disposable battery.

In the illustrated embodiment, each remote receiving unit 1201 could include a cell tower, a satellite, another Mesh device, a WiFi router, or a similar device. Specifically, each remote receiving unit 1201 could include a communication unit 1213 operatively connected to a processing unit 1214 and an antenna 1212 operatively connected to the communication unit 1213. The processing unit 1214 may further be connected to a local database, or to a remote database 1217 through a data network 1215 such as the internet or the like. The database, the remote receiving unit 1201 or the sensing apparatus 100 could further be accessed by a user via a remote device 1216 such as a mobile device, a smartphone, a personal computer or the like to visualize the measurements made by the apparatus 100. In one embodiment, the remote device 1216 could further be configured for controlling movement of the cover 403 between the open and closed positions.

In yet another embodiment, the apparatus 100 may not be connected to a remote receiving unit 1201 and could instead be directly operatively connected to the remote deice 1216.

Figure 11:
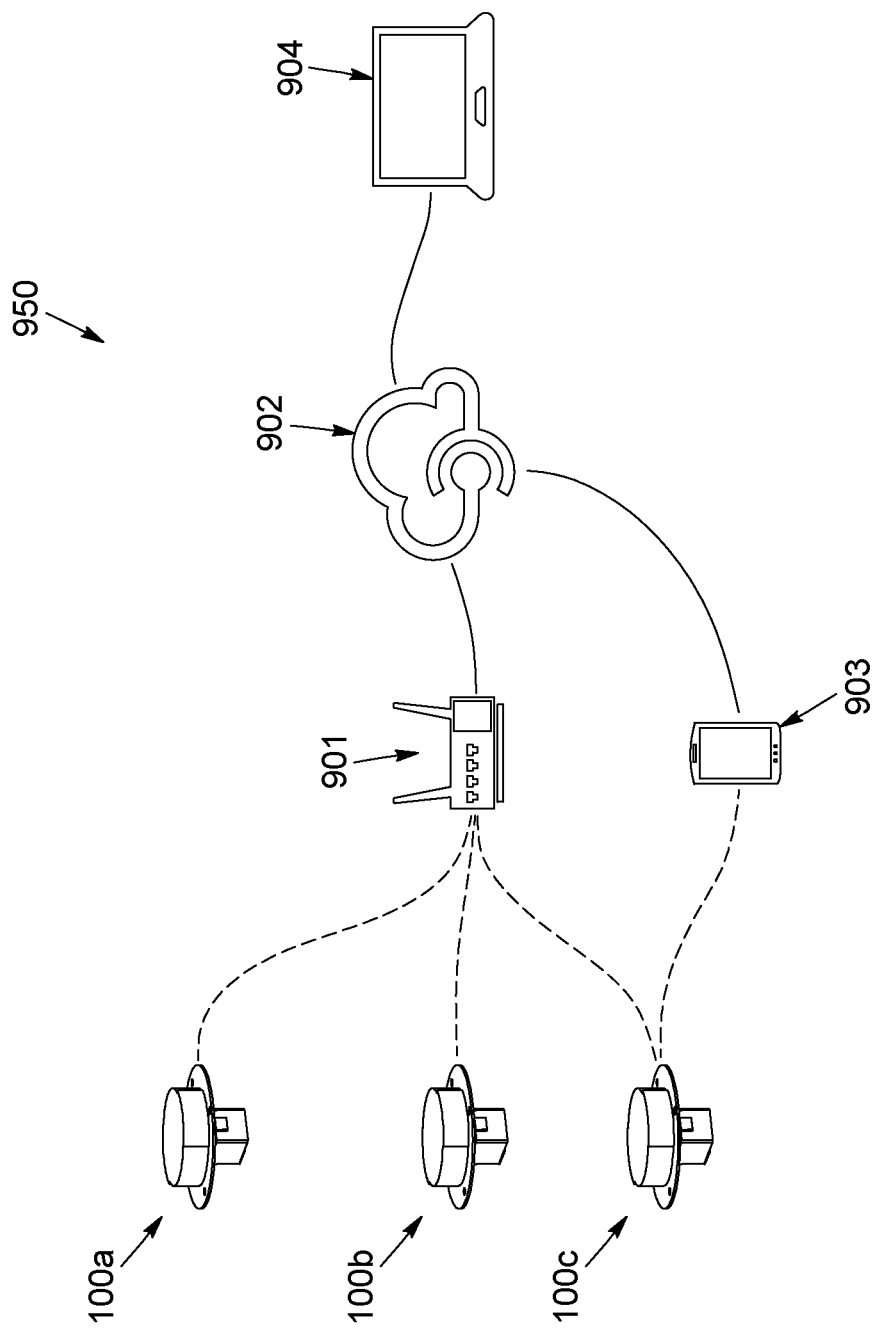
FIG. 11 is a network diagram showing a sensing apparatus network for the sensing apparatus illustrated in FIG. 1, in accordance with one embodiment.

Now turning to FIG. 11, the sensing apparatus 100 could further be part of a sensing apparatus network 950. In the illustrated embodiment, the network 950 includes a plurality of sensing apparatuses 100a, 100b, 100c each one associated with a corresponding silo, send data over radio frequencies or other suitable transmission means to a receiver gateway 901 which is connected to a data network such as the internet or the like to allow the receiver gateway 901 to send data to one or more cloud servers 902 on which data may be stored, treated and analyzed. In this configuration, stored data can be retrieved and displayed on a dynamic interface forming part of a website or a computer software 904 or of a mobile website or software 903.

It will be understood that the above embodiments are provided as examples only, and that other implementations may be considered. For example, instead of being configured for measuring a level of the substance in the silo, the sensor instead be configured to measure another parameter of the substance which may require the sensor to be oriented in a specific orientation relative to the top surface of the substance contained in the silo.

It will also be understood that the location of the center of mass CM of the sensing assembly 201 may depend on the mass and location of the housing 302 and of the components contained in and attached to the housing 302, including the sensor 300 and any other components contained in or attached to the housing 302. The components may be positioned in relation to the housing 302 such that the center of mass of the sensing assembly 201 is located at a desired location. For example, the position of the components of the sensing assembly 201 in the housing 302 may be selected such that the center of mass of the sensing assembly 201 is located along the longitudinal axis $L_1$, as described above. In one embodiment, the sensing assembly 301 may further include one or more weights disposed within the housing 302, and more specifically disposed within the sensor containing chamber 303, in another chamber inside the housing 302, disposed within the sidewall 400 or the end wall 402 of the housing 302, or attached to the exterior of the housing 302, the one or more weights being positioned such that the center of mass CM of the sensing assembly 201 is at a desired location.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A sensing apparatus for monitoring a substance contained in a storage building, the apparatus comprising:
   a mounting bracket securable to a roof of the storage building;
   a sensing assembly having a center of mass, the sensing assembly including:
   a housing pivotally connectable to the mounting bracket and hanging from the mounting bracket when connected thereto to be freely pivotable relative to the mounting bracket about a pivot axis, the center of mass of the sensing assembly being located below the pivot axis to urge the housing towards an operative position by gravity; and a sensor mounted to the housing and configured to measure a parameter of the substance in the storage building when the sensor is in a measuring orientation, wherein the sensor is configured in the measuring orientation when mounted to the housing with the housing being configured in the operative position.

2. The apparatus as claimed in claim 1, wherein the mounting bracket is configured to be positioned above the roof and adjacent a roof opening defined in the roof, the housing being connected to the mounting bracket such that the housing extends through the roof opening.

3. The apparatus as claimed in claim 1, further comprising a sealing lid fastenable to the mounting bracket to cover the housing and wherein the housing defines a sensor containing chamber and the sensor is contained inside the sensor containing chamber.

4. The apparatus as claimed in claim 1, further comprising at least one pivot pin extending along the pivot axis, the at least one pivot pin extending from one of the housing and the mounting bracket and engaging the other one of the housing and the mounting bracket to allow the housing to pivot relative to the mounting bracket.

5. The apparatus as claimed in claim 4, wherein the at least one pin extends from the housing, and wherein the mounting bracket includes at least one pin opening for receiving the at least one pin; and wherein the at least one pivot pin includes a pair of pivot pins extending outwardly from the housing on either side of the housing, and wherein the at least one opening includes a pair of pivot openings, each pivot opening being sized and shaped to receive a corresponding pivot pin.

6. The apparatus as claimed in claim 5, wherein the mounting bracket includes a flat annular body having a bottom face configured to be disposed towards the roof and a top face, and a rim wall extending away from the top face, the at least one pin opening includes a pair of pin openings being defined in the rim wall; and wherein the rim wall includes a bottom edge connected to the annular body and a top edge opposite the bottom edge, and wherein the pair of pin openings includes a pair of semi-circular indents extending from the top edge towards the bottom edge to allow the housing to be lowered on the mounting bracket such that each pivot pin engages a corresponding semi-circular indent.

7. The apparatus as claimed in claim 1, wherein the sensor is configured for providing a signal downwardly towards a top surface of the substance along a linear signal path such that the signal is reflected on the top surface of the substance, and for receiving the reflected signal, and wherein, when the housing is in the operative orientation, the sensor is positioned relative to the top surface of the substance such that the reflected signal travels back upwardly towards the sensor along the linear signal path.

8. The apparatus as claimed in claim 7, wherein the sensing assembly further comprises a processing unit operatively connected to the sensor, the processing unit being configured to determine a distance between the sensor and the top surface of the substance based on a time period between an emission of the signal towards the substance and a reception of the reflected signal; and wherein the signal is one of a light wave and a sound wave.

9. The apparatus as claimed in claim 7, wherein when the housing is in the operative position, the linear signal path extends substantially vertically and the pivot axis extends substantially horizontally.

10. The apparatus as claimed in claim 1, wherein the housing includes a bottom end and a top end, the pivot axis extending through the housing proximal the top end thereof and the center of mass of the sensing assembly is located towards the bottom end of the housing.

11. The apparatus as claimed in claim 10, wherein the housing defines a central longitudinal axis intersecting the pivot axis and extending perpendicular thereto, the center of mass of the sensing assembly being located along the longitudinal central longitudinal axis.

12. The apparatus as claimed in claim 11, wherein the housing includes a sidewall, a planar end wall extending orthogonally to the sidewall and a sensor opening defined in the end wall, the sensor being positioned adjacent the sensor opening and being oriented towards the sensor opening to provide the signal therethrough; and wherein the sensing assembly further includes a cover movably connected to the housing, the cover being movable between an open position in which the sensor opening is uncovered to allow the signal from the sensor to be provided towards the top surface of the substance and a closed position in which the sensor opening is covered.

13. The apparatus as claimed in claim 12, wherein the cover is planar and extends generally parallel to the end wall, the cover being pivotably connected to the end wall and pivotable about a pivot axis extending orthogonally to the end wall and to the cover.

14. The apparatus as claimed in claim 12, wherein the sensing assembly further includes a cover actuator operatively connected to the cover to control movement of the cover between the open and closed positions.

15. A sensing apparatus for monitoring a substance contained in a storage building, the sensing apparatus comprising:
a sensor for monitoring the substance contained in the storage building;
a housing mounted to a roof of the storage building and defining a sensor containing chamber for housing the sensor and positioning the sensor above the substance, the housing including a sensor opening for allowing the sensor access to the substance contained in the storage building, the housing being mounted to the storage building such that the sensor opening is located within the storage building; and
a cover movably connected to the housing, the cover being movable between a closed position in which the bottom opening is covered and an open position in which the sensor opening is at least partially uncovered.

16. The apparatus as claimed in claim 15, wherein the sensing assembly further includes a cover actuator operatively connected to the cover to control movement of the cover between the open and closed positions.

17. The apparatus as claimed in claim 15, further including a mounting bracket secured to the roof of the storage building, wherein the housing is pivotally connected to the mounting bracket to pivot about a pivot axis, the center of mass of the sensing apparatus being located below the pivot axis.

18. The apparatus as claimed in claim 15, wherein the sensor is configured for providing a signal downwardly towards a top surface of the substance through the sensor opening when the cover is in the open position such that the signal is reflected on the top surface of the substance and for receiving the reflected signal through the sensor opening when the cover is in the open position, the sensor providing the signal along a linear signal path.

19. The apparatus as claimed in claim 18, wherein the housing includes a sidewall and an end wall extending orthogonally to the sidewall, the sensor opening being defined in the end wall; wherein the cover is planar and extends generally parallel to the end wall, the cover being pivotably connected to the end wall and pivotable about a pivot axis extending orthogonally to the end wall and to the cover.

20. A method for installing a sensing apparatus to a roof of a storage building, the sensing apparatus being configured to monitor a substance contained in a storage building, the method comprising:
 securing a mounting bracket to a roof of the storage building such that indents of the mounting bracket face generally upwardly;
 providing a sensing assembly including a housing and a sensor housed in the housing, the sensor being configured for sensing a parameter of the substance in the storage building, the sensing assembly further including pivot pins extending outwardly from the housing and defining a pivot axis; and
 engaging the sensing assembly with the mounting bracket by engaging each one of the pivot pins in a corresponding one of the indents to allow the housing to pivot freely relative to the mounting bracket about the pivot axis, the sensing assembly having a center of mass located below the pivot axis such that the housing is urged towards an operative orientation by gravity.

21. The method as claimed in claim 20, further comprising:
 forming a roof opening in the roof of the storage building and securing the mounting bracket adjacent to the roof opening with the housing extending at least partially into the roof opening;
 after engaging the sensing assembly with the mounting bracket, fastening a sealing lid to the mounting bracket to cover the housing; and
wherein the indents defined in the mounting brackets comprise a pair of semi-circular indents and the pivot pins comprise a pair of pivot pins extending along the pivoting axis.

* * * * *